Figure 5:
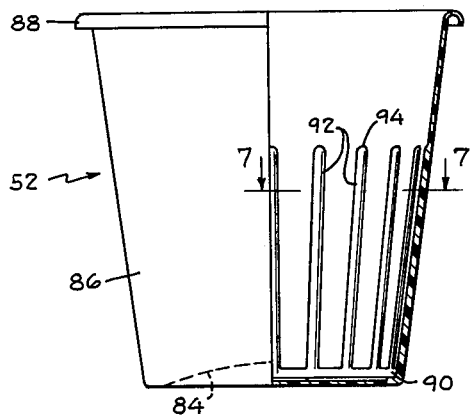

Feb. 19, 1963
D. S. WELSHON
3,078,025
SHEET FORMED MOLDED ARTICLES
Filed May 10, 1961
2 Sheets-Sheet 1
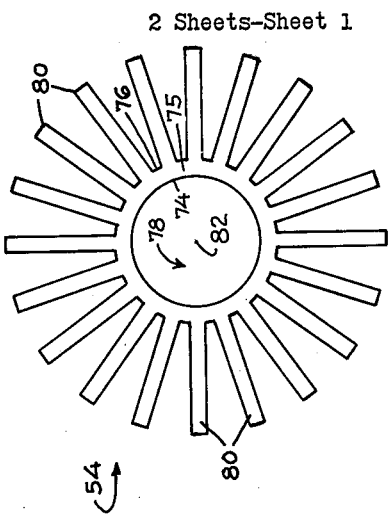
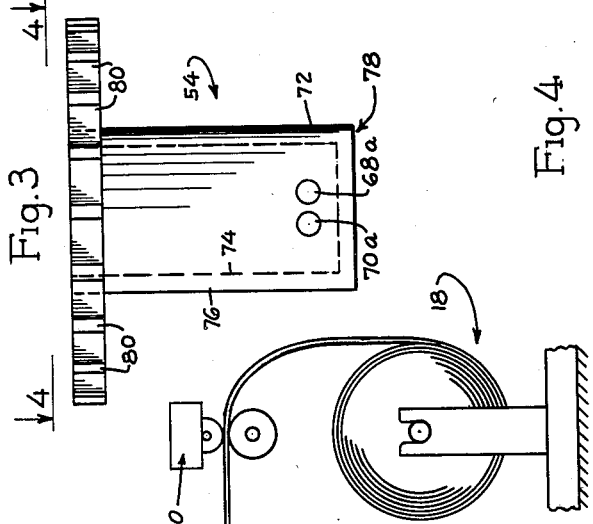
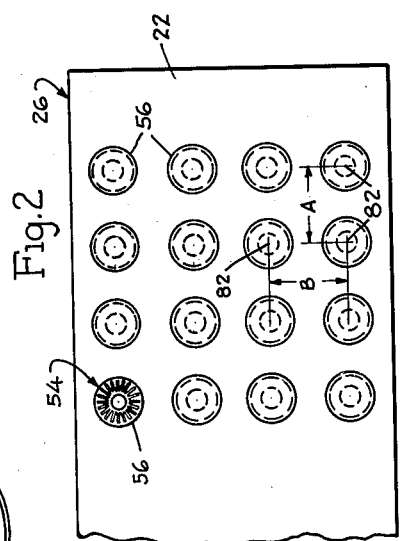
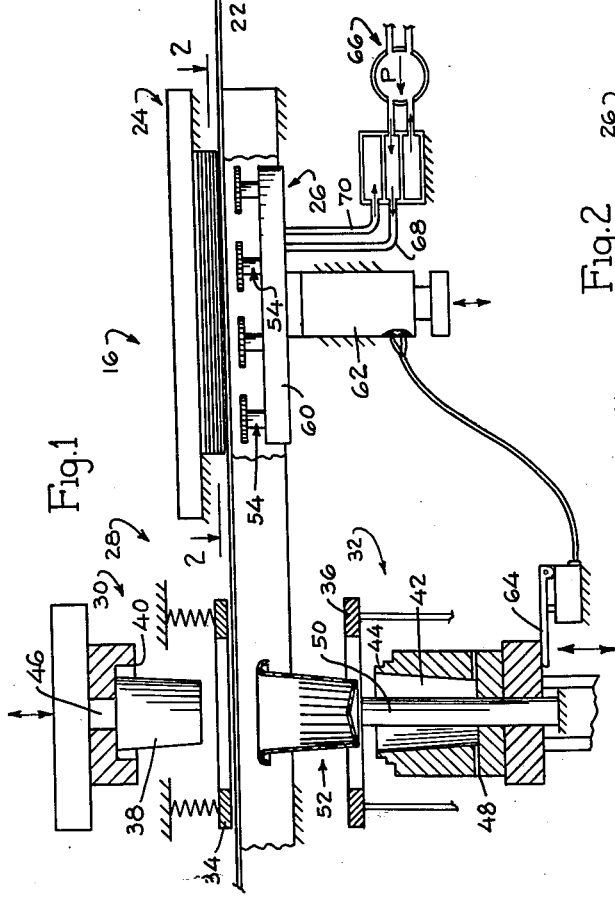
INVENTOR.
Donald S. Welshon
BY
ATT'Y.

Feb. 19, 1963 D. S. WELSHON 3,078,025

SHEET FORMED MOLDED ARTICLES

Filed May 10, 1961 2 Sheets-Sheet 2

INVENTOR.
Donald S. Welshon
BY
ATT'Y.

United States Patent Office 3,078,025
Patented Feb. 19, 1963

3,078,025
SHEET FORMED MOLDED ARTICLES
Donald S. Welshon, Elmhurst, Ill., assignor to Illinois
Tool Works, Inc., a corporation of Delaware
Filed May 10, 1961, Ser. No. 109,226
3 Claims. (Cl. 229—1.5)

This invention relates in general to the method and apparatus for making patterns in plastic articles formed from sheet as well as to the articles per se. More particularly, the invention relates to the method and apparatus for molding articles from a uniform web of plastic material and to provide patterns wherein there are thin and thick sections on the finished article. The articles thus formed are novel as well.

Sheet forming molding techniques usually described as vacuum forming and blow molding, enjoy the economic advantage of permitting multiple molding, fast cycling, relatively inexpensive tooling and high precision as compared with many other molding techniques. Heretofore, these processes have been limited to manufacturing articles having a substantially uniform wall thickness or to articles where there is a linear change in the wall thickness.

This invention is concerned with the method and apparatus for selectively providing thickened portions on sheet formed articles in a desired pattern and location. This approach leads to many new article devices having new commercial significance. The invention is directed toward the concept of pre-chilling or pre-freezing a selected portion or portions of a heated web of plastic material as it is prepared for the molding process so that the expansion or stretching of the material will not be uniform when placed between opposed mold members. Thus, selectively thickened and thinned portions of the wall are formed on the articles of manufacture. This method and apparatus accomplishes these ends without detraction from the general advantages that accrue to well known sheet forming methods. Further, controlled thickness may be afforded to any portion of an article such that new articles heretofore unavailable by sheet forming techniques can now be made.

It is thus the general object of this invention to provide an improvement to the sheet forming molding process which affords selectively thickened and thinned areas on an article being molded.

It is a further object of this invention to provide a method and apparatus which uniformly heats a plastic web material to permit the stretching thereof and then selectively pre-cools certain portions of the heated material so that the cooled portion will not stretch or thin under pressure to as great an extent as the non-cooled portion.

It is the further object of this invention to provide thin walled plastic articles of manufacture of medium size, such as containers, lids and the like, wherein the major portion of the walls of the articles have a wall thickness below .035 inch and having selected thickened areas or patterns on the article to provide structural strength thereto.

Figure 6:
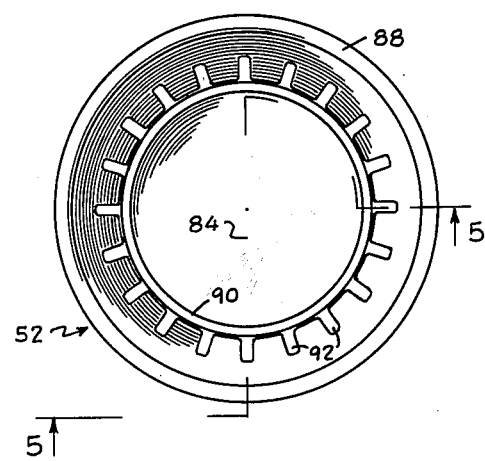
Figure 8:
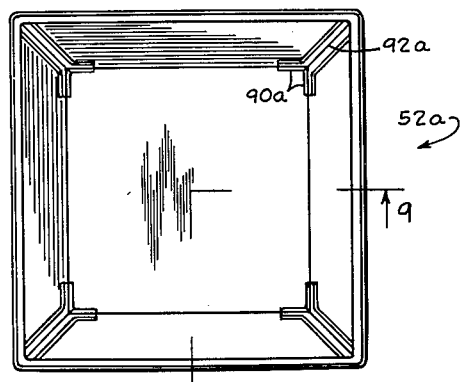
Figure 7:
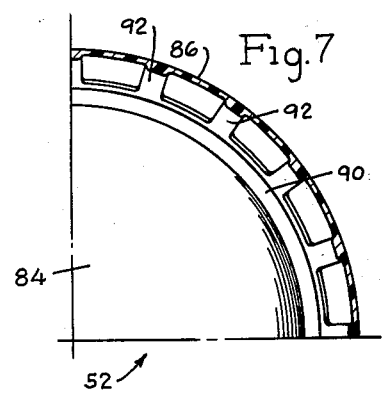
Figure 9:
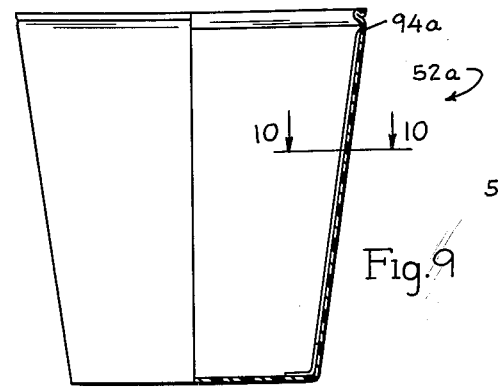
Figure 10:
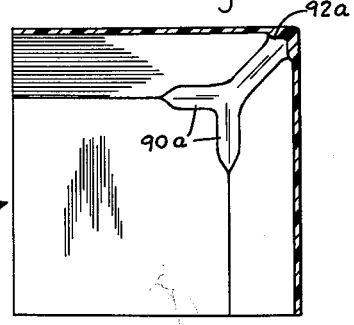

The novel features which are characteristic of the invention are set forth with particularity in the appended claims. The invention, both as to its organization and operation, together with additional objects and advantages thereof, will be best understood by the following description of specific embodiments in conjunction with the accompanying drawings, in which:

FIG. 1 is a side elevational view, somewhat diagrammatic in form, and portions being in section, showing apparatus for molding of articles of manufacture from sheet plastic material;

FIG. 2 is a sectional view along lines 2—2 of FIG. 1;
FIG. 3 is an enlarged fragmentary side elevational view of one pattern unit shown in FIGS. 1 and 2;
FIG. 4 is a top plan view along lines 4—4 of FIG. 3;
FIG. 5 is a partial sectional view of an article of manufacture produced by the apparatus shown in FIG. 1, the section being taken along lines 5—5 of FIG. 6;
FIG. 6 is a top plan view of the article shown in FIG. 5;
FIG. 7 is a sectional view along lines 7—7 of FIG. 5;
FIG. 8 is a top plan view similar to FIG. 6 of another embodiment of article that may be produced by the instant apparatus and method;
FIG. 9 is a partial sectional view along lines 9—9 of FIG. 8; and
FIG. 10 is a partial sectional view along lines 10—10 of FIG. 9.

The apparatus 16 shown in FIG. 1 is a schematic presentation of sheet forming apparatus of the general type shown in the copending application S.N. 840,611, filed September 17, 1959, and assigned to the same assignee, the apparatus 16 being modified as shall be discussed. The apparatus 16 comprises a supply reel 18 of suitable sheet stock plastic material such as polystyrene, polyethylene, or other thermoplastic of similar nature. Feeding and indexing means 20, (shown schematically) feeds the sheet material 22 past a heating means station 24, the heating being accomplished by infrared heaters or resistance heaters, etc., as suitable and desired. Means 26 for cooling preselected portions of the heated sheet material may be located directly below the heating means 24, and actuated in time relationship to the movement of indexing means 20 and the mold means 28. The mold means 28 is here shown as a single cavity type which is intended to diagrammatically represent a plurality of like mold means as shown in the aforementioned copending application. The mold means 28 essentially comprises an upper mold portion 30 and a lower mold portion 32. Individual clamp means 34 and 36, which are annular in configuration have a diameter larger than the upper and lower mold portions 30 and 32 and may be actuated (by means not shown) so as to engage the material prior to engagement by either of the upper and lower mold means. Other means for clamping the sheet material are known and are contemplated as for example as shown in U.S. Patent 2,891,280. The upper mold portion 30 comprises a plug 38 and an annular clamp and cut-off portion 40. The clamping cut-off edge 40 of the upper mold member 30 serves the dual purpose of clamping the material 22 around the edge of the lower mold member 32 and later providing a cut-off of the discrete article from the web of material. A post-cutting operation may be substituted rather than separation of the molded articles from the web in the mold if desired.

The lower mold member 32 has a molding cavity 42 and an upper lip portion which provides a clamping cut-off edge 44 for cooperation with edge 40 on the upper mold portion 30.

The sequential operation of the apparatus in general comprises the feeding of a discrete amount of plastic sheet material which has been heated at 24 between the opposed mold portions 30 and 32, clamping the material in the clamps 34 and 36, relatively moving the sheet material and the upper mold portion 30 so as to cause the mandrel or plug 38 to mechanically draw the material, then relatively moving the upper mold portion and the lower mold portion into telescoping relation so as to seal the material between edges 40 and 44, applying a pressure differential across the web as by introduction of positive air pressure to a suitable aperture such as 46 in the upper mold member or in the alternative by applying a vacuum through ports 48 is the lower mold portion 32 or combination of the positive and negative pressure differentials. The introduction of the pressure differential causes the stretched material to leave contact with the plug 38 and move into contact with the mold cavity 42 whereupon it is chilled. Continued relative movement of the upper and lower mold portions causes edge 40 to shear the web around mold portion 44 whereupon the mold portion separates in a manner such that a knock-out plug 50 raises the article relative to the lower mold portion for ejection by suitable means not shown. The feed means 20 indexes new material into position and the cycle repeats.

The apparatus 16 just described will manufacture lids and cup-like articles of medium size (as for example in the neighborhood of ¼ inch to 10 inches in axial height and ¾ inch to 10 inches diameter at the mouth) having a substantially uniform wall thickness of .0015 inch to .035 inch as desired. However, because of the nature of the material used and the type of the molding operation, substantial structural strength in the article is often difficult to maintain particularly in the area of the junction of the side wall and the bottom wall of the article such as 52. Also, the side walls are of such too thin cross section in certain applications which gives rise to undesirable flexibility. Therefore, in the manufacture of articles such as the container 52, the amount of basic raw material in the article plays a major function in the cost to the article. While substantially uniform in thickness articles may be produced, complete uniformity is as a practical matter difficult to obtain. The necessary structural strength of the thinnest portion determines the ultimate thickness of the article.

By the method now to be discussed, portions of an article that are formed too thin for practical usage from sheet material of a selected thickness, and hence normally would require the use of thicker material may be preselectively thickened, and at the same time overall amount of material in the article may be kept to a minimum. Consequently, cost savings are enjoyed. Further, the thickened areas by proper design may provide a strut action in an article.

To accomplish the above desired results there is provided a cooling or prechilling means 26 located immediately below the heating means 24. The means 26 comprise a plurality of individual pattern units 54 mounted on a base 60, coolant means, pump means, actuator means and control means as shall be now described. The units 54 are positioned below the sheet material 22 in spaced apart relation and concentric with lines 56 which are diagrammatic representations of the outline of a plurality of mold cavities 44 which the sheet is designed to cooperate with as will be understood. The plastic sheet 22 has been apertured in the upper left hand corner of FIG. 2 to show the relative relationship of a unit 54 to the circular line 56 representing a mold cavity aperture for purposes of clarity. The base 60 with units 54 thereon is actuated between a sheet engaging and a retracted position by a suitable operator means 62 (such as, for example, an air cylinder). The air cylinder 62 is in turn actuated in timed relationship to movement of the mold means 28 by a suitable control means 64 here shown as a switch associated with the lower mold portion 32.

The individual cooling pattern units 54 are preferably cooled by a coolant which is circulated by pump means 66 having a passageway inlet means 68 which enters the unit 54 at 68a (see FIG. 3). Passageway outlet means 70 permits the coolant to leave the unit 54 at 70a, it being understood that suitable manifold means is provided in the base for each unit 54. The unit 54, best seen in FIGS. 3 and 4, may be formed with a hollow stem portion 72 formed by concentric spaced inner and outer walls 74 and 76. The stem 72 is open at the top but closed across the bottom to provide a housing or chamber. The inlet and outlet 68a and 70a may be formed in the outer wall 76 and the space between the inner and outer walls may be configured to assure circulation of the cooling fluid throughout the entire unit 54.

A plurality of radial spokes 80 are located adjacent to the top 75 of the stem 72 and are co-planar with said top 75 and with each other. Communication of the spokes 80 with the chamber formed by walls 74 and 76 for movement of the cooling fluid may be provided. The radial extent of the tips of the spokes 80 is usually less than the inner diameter of the clamp means 34 and 36, but under certain conditions may be larger than said diameter depending on the configuration of the final desired molded article.

Control means 64 causes movement of the base 60 and units 54 into engagement with the underside of the heated web 22 of sheet material just prior to the indexing of the heated material to molding position between the opposed and aligned mold members 30 and 32. By controlling the temperature of the units 54 and the time duration of impingement of the head of the cooling unit 54 on the heated web 22, selected portions of the web may be chilled as compared to the remaining portion of the web. The amount of chilling of the selected portions of the web is determined by the ultimate configuration desired and may be varied from a very slight chilling to a substantial freezing of selected portions of the web. For example, when using sheet material such as rubber modified polystyrene sold by Dow Chemical Corporation as Formula 475B, the extrusion temperature of the sheet material 22 when it is formed is approximately 400° F. The material 22 freezes at a temperature of approximately 195° F. and the molding temperature of the sheet 22 when in the mold means 28 is in the approximate range of 240° F. to 285° F. When the sheet temperature is below 240°, the pressures required for molding become impractically large and when the sheet temperature exceeds 285° F., the sheet sags excessively and is difficult to transport from the heating means 24 to the mold means 28. It has been found that when the sheet 22 located within the mold means 28 has a temperature differential between various portions thereof which exceed approximately 5° F., a detectable thickening will occur in the finished product. The greater the temperature differential between adjacent relatively hot and cool portions, the more the hotter portions will stretch relative to the cool portions. Since the freezing points, melting points, and temperature-plasticity curves for each plastic material vary, the above temperatures are to be considered illustrative only. It will be apparent that for any particular plastic material, the maximum thickness of a preselected chilled portion of the material is the starting or original thickness of the material 22. A complete range of thicknesses is available from undetectable to maximum and is dependent on the temperature differential between the various portions. A slight departure from theoretical values is occasioned by heat migration from the hotter to the cooler portions of the sheet, but if the sheet is moved from the station adjacent to means 24 and 26 to the mold means 28 relatively rapidly, this does not pose a serious problem. By the use of pattern units such as 54, and by controlling the temperature thereof and alignment thereof relative to the alignment of the mold means, an article such as 52 may be produced.

As shown in FIG. 5, the container article 52 is formed with the spider-like wall configuration and comprises a bottom wall 84 having upwardly outwardly diverging side walls 86 terminating in a reversely bent rim portion 88. The portion 90 in the immediate vicinity to juncture of the side wall 86 and the bottom wall 84 is thick as compared to the wall thickness of most of the remainder of the article and is that portion that is contacted by surface 75 of the unit 54. Additionally, a plurality of ribs 92 are formed in the side wall 86 in symmetrical arrangement, there being one rib for each finger 80 on unit 54. The vertical height 94 of the ribs 92 is determined by the radial extent of the finger portions 80 of the cooling head. By selectively chilling portions of the web 22 with units 54, portions of the sheet formed article that normally are structurally too weak for practical use may be selectively thickened to any desired degree and the placement of thickened portions may be varied within wide limits. The placement of various designs of thickened portions on the article may be accomplished by varying the configuration of the units 54. For example, a series of horizontal rings of thick and thin portions on the side walls of a container may be conveniently formed by having a pattern head with a plurality of concentric rings (not shown). Sinusoidal wave forms of ribs may be conveniently formed by appropriately configuring the units 54. It will be further realized that the thicknesses of material shown in FIG. 5 are to be considered semi-diagrammatic, since in reality the actual thicknesses are of an order of thousandths of an inch and thus actual representation is difficult. For example, the thicknesses of the wall material in the article shown may be in the neighborhood of 7 or 8 thousandths of an inch in the areas 92 and 90 and the remainder may be as thin as 2½ to 3½ thousandths of an inch. Thus, by the technique and method disclosed, an article normally too fragile for practical use may be manufactured with sufficient strength and at a much lower cost due to the employment of less overall amount of material with strategic placement of the areas to be thickened.

Another article embodiment illustrative of what may be produced by the instant invention is shown in FIGS. 8 through 10. Similar reference numerals to those used in FIGS. 5–7 are employed with the suffix "a" in the description thereof. In sheet forming of square articles, difficulty is encountered particularly in the corner areas since the nature of the molding process requires that this portion of the original web of material must be moved or deflected, and thus stretched, the greatest distance from the original sheet from which it is formed. By using a suitable designed cooling head 54, the portions of the sheet material which ultimately become the corners of the articles are contacted and prechilled, as will be seen in FIGS. 8 to 10, and these normally weak areas 92a and 90a are thus reinforced and strengthened. The formation of rectilinear articles by use of the instant method is thus facilitated and overall reduction in total amount of material used is accomplished.

Although specific embodiments have been shown and described, it is with full awareness that many modifications thereof are possible. The invention, therefore, is not to be restricted except insofar as is necessitated by prior art and the spirit of the appended claims.

What is claimed as the invention is:

1. A cup shaped article of manufacture formed from thin sheet stock plastic material of initially substantially uniform thickness into a thin walled cup shaped article and including a bottom, an integral side wall extending upwardly and outwardly therefrom to a thickened lip portion defining an open mouth, said thickened lip portion serving to reinforce said thin side wall in the vicinity of the open mouth, said side wall for a portion of its longitudinal extent as measured from the bottom toward said lip portion of the cup shaped article provided with a plurality of longitudinally extending substantially equally spaced thickened rib portions, each pair of adjacent rib portions being separated by a web portion having a minimum thickness at a point intermediate adjacent rib portions and increasing in thickness in a direction toward each of the adjacent rib portions, said web portion located between said rib portions being thinner than the average radial wall thickness of the cup shaped article and of a thickness normally too fragile to be grippingly grasped by the hand when the article is filled with a fluid or the like, the portion of said side wall located between said lip portion and the terminations of said rib portions being of substantially uniform thickness about the periphery of the container and of a thickness less than the thickness of said rib portions but greater than the thickness of the side wall web portions intermediate said rib portions, the peripheral measurement of the web portions intermediate said rib portions being at least three times the peripheral extent of each of the rib portions which serve to rigidify said wall against radial collapse as an incident to being grasped by the hand of the user.

2. A cup shaped article of manufacture formed from thin sheet stock plastic material of the type set forth in claim 1, wherein said rib portions in the vicinity of the juncture of the side wall of the cup shaped article with the bottom of the cup shaped article are connected together by a horizontally extending rib, said horizontally extending rib serving to strengthen the area of the cup in the vicinity of the juncture of the side wall and bottom thereof.

3. A cup shaped article of manufacture formed from thin sheet stock plastic material of the type described in claim 1, wherein the cup shaped article is of a polygonal nestable configuration and at least certain of said rib portions are located at the intersection of side walls of the polygon.

References Cited in the file of this patent

UNITED STATES PATENTS

| | | |
|---|---|---|
| 1,122,393 | House | Dec. 29, 1914 |
| 2,348,871 | Wiley | May 16, 1944 |
| 2,530,124 | Kieckhefer | Nov. 14, 1950 |
| 2,773,624 | Knieriem | Dec. 11, 1956 |
| 2,787,397 | Radford | Apr. 2, 1957 |
| 2,805,790 | Smucker | Sept. 10, 1957 |
| 2,925,208 | Wood | Feb. 16, 1960 |
| 2,932,437 | Wilcox | Apr. 12, 1960 |